J. M. BOTTUM.
Measuring Force of Hair Springs for Watches.
No. 24,366.                                Patented June 14, 1859.
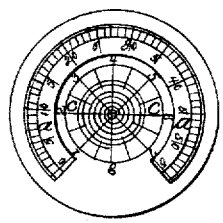
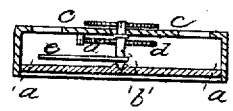

UNITED STATES PATENT OFFICE.

JAMES M. BOTTUM, OF NEW YORK, N. Y.

INSTRUMENT FOR MEASURING THE STRENGTH OF WATCH-SPRINGS.

Specification of Letters Patent No. 24,366, dated June 14, 1859.

*To all whom it may concern:*

Be it known that I, JAMES M. BOTTUM, of the city, county, and State of New York, have invented an Instrument for the Measurement of the Contractive and Expansive Force of Spiral Hairsprings for Watches, which I denominate a "Librometer," which shows the exact power of the spring to contract the librations of the balance wheel.

Before my instrument was devised, many expedients were resorted to for the purpose of ascertaining the exact strength of the hair-spring—a matter of great importance in watch repairing and rating. Weights and other forces were used to draw the spiral out, sidewise, and distend it; but it will be obvious that none of these will denote accurately the exact force of the spring in the direction of the spiral curve, or in the curve in which it is to act.

In experimenting, as heretofore practiced, the spring was very liable to distortion and injury, so as to make a change of hair-springs in a watch, a very difficult and expensive operation. My little instrument obviates all the before enumerated difficulties, is easily applied, and at once determines the power of the spring, or any number of coils thereof, with the most precise accuracy, and without the slightest injury to the spring itself. Any number of springs can be readily tested in rapid succession and their relative powers compared.

The construction is as follows: A dial plate $a$, on which are marked small divisions around the periphery, has a frame or case surrounding it, as clearly indicated in the drawing. At the center of the dial there is an axis or arbor $b$, standing perpendicular thereto and supported by a collar above in a crossbar or cap piece at $c$, below which there is a spiral spring $d$, one end of which at the center of the coil, is affixed to the arbor $b$, and the other, to a stationary stud. A hand $e$, is also affixed to the arbor which, as it revolves, sweeps around over the dial $a$. The top of the arbor has a slit cut in it, or any other convenient mode of readily connecting the inner end of a hair-spring, which is to be tested, thereto. The mode of testing said hair-spring is, to seize it with a pair of forceps or other device for holding and moving the spring at any determined point thereon, and then revolving it one turn, thus allowing its force to react on the arbor and turn it together with the index, so as to show the exact power of the spring, in the direction of its natural action in the watch.

Having thus fully described my "librometer," what I claim and desire to secure by Letters Patent, is,—

An arbor having a measuring spring affixed thereto, together with an index, substantially as herein described, and an attachment for attaching the hair-spring to be measured, combined and arranged in the manner and for the purposes set forth, and constituting a ready means of determining the exact force of said hair-springs, as above specified.

J. M. BOTTUM.

Witnesses:
   JAS. W. FRASER,
   HENRY H. MORAN, Jr.